W. E. REILLY.
ROUTE INDICATOR.
APPLICATION FILED MAY 3, 1915.
1,175,992.
Patented Mar. 21, 1916.
3 SHEETS—SHEET 2.
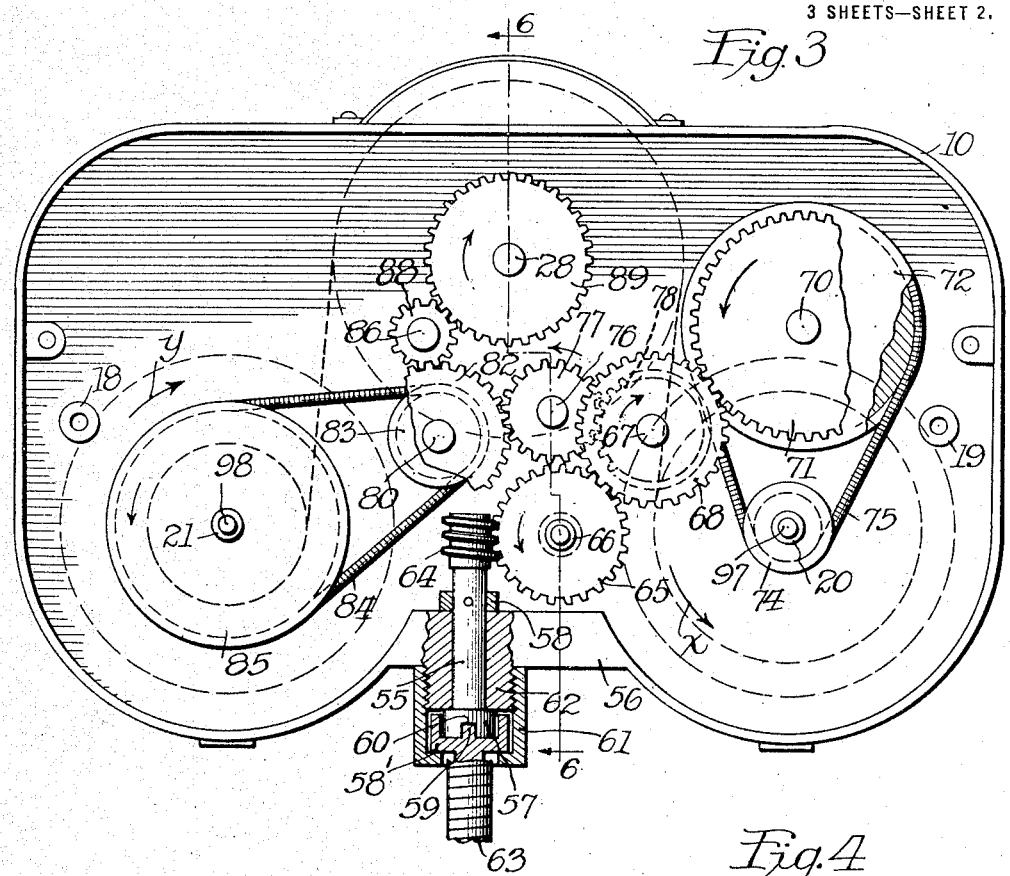
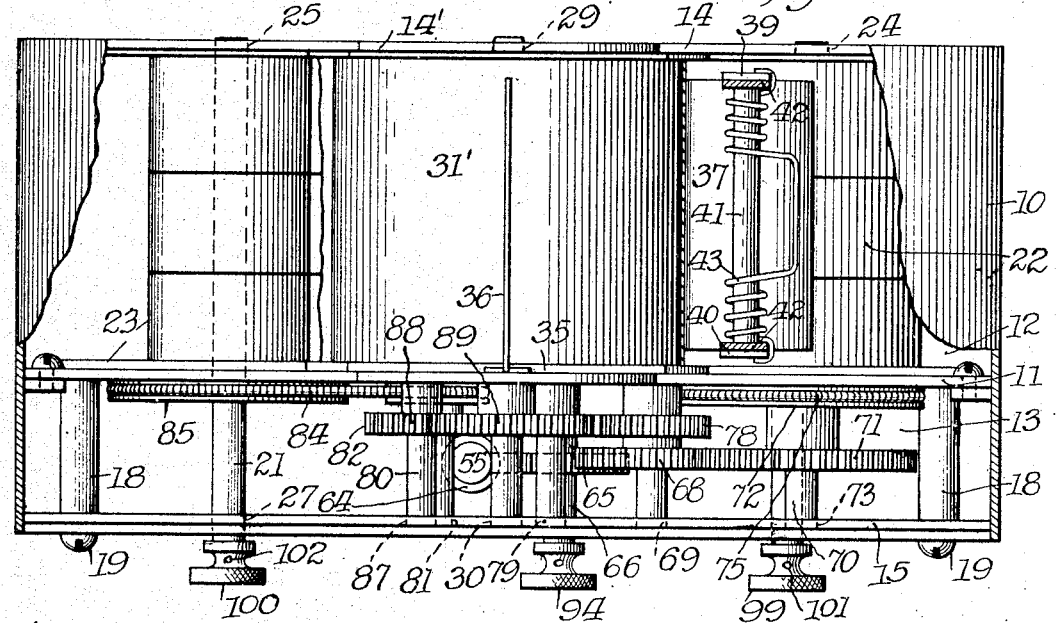
Witnesses:
Leonard W. Novander
Charles A. Bastar
Inventor
William E. Reilly
By George D. Imes,
Att'y W. E. REILLY.
ROUTE INDICATOR.
APPLICATION FILED MAY 3, 1915.
1,175,992.
Patented Mar. 21, 1916.
3 SHEETS—SHEET 3.
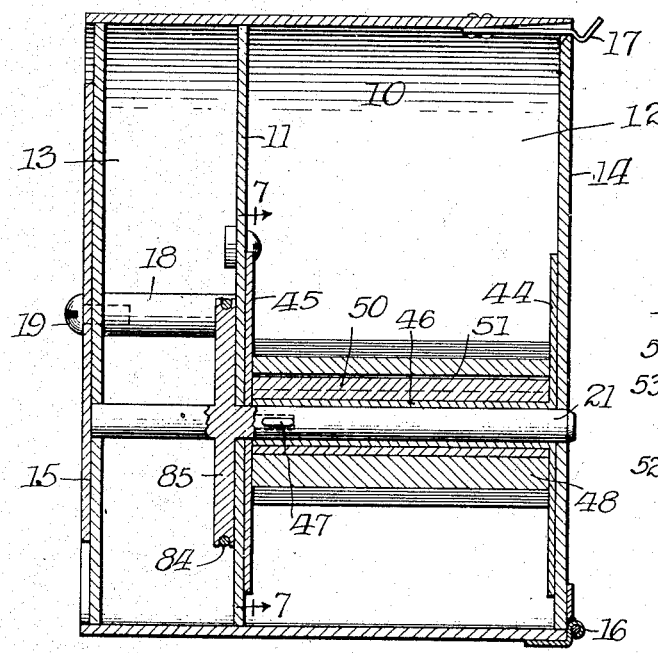
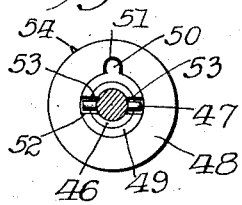
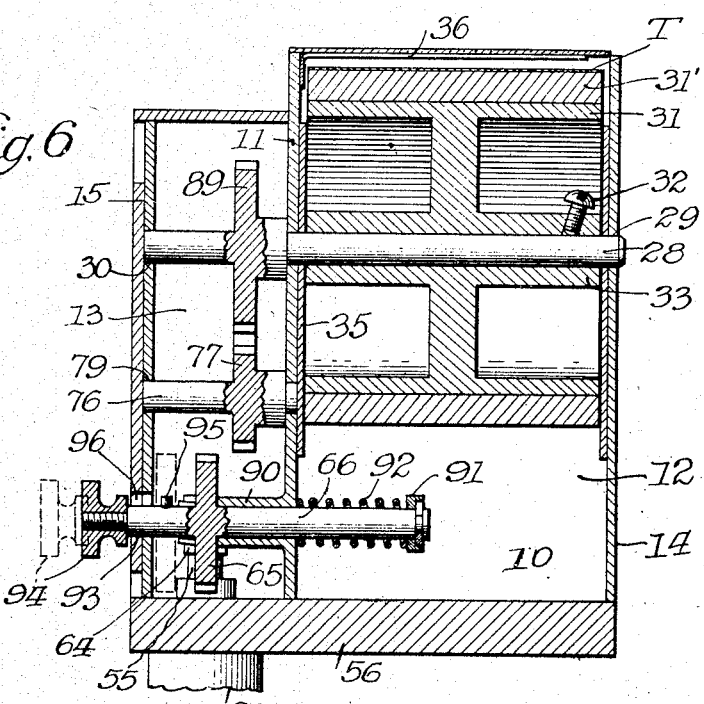
Witnesses:
Leonard W. Novander
Charles A. Bastar
Inventor
William E. Reilly
By George D. Sines
Att'y

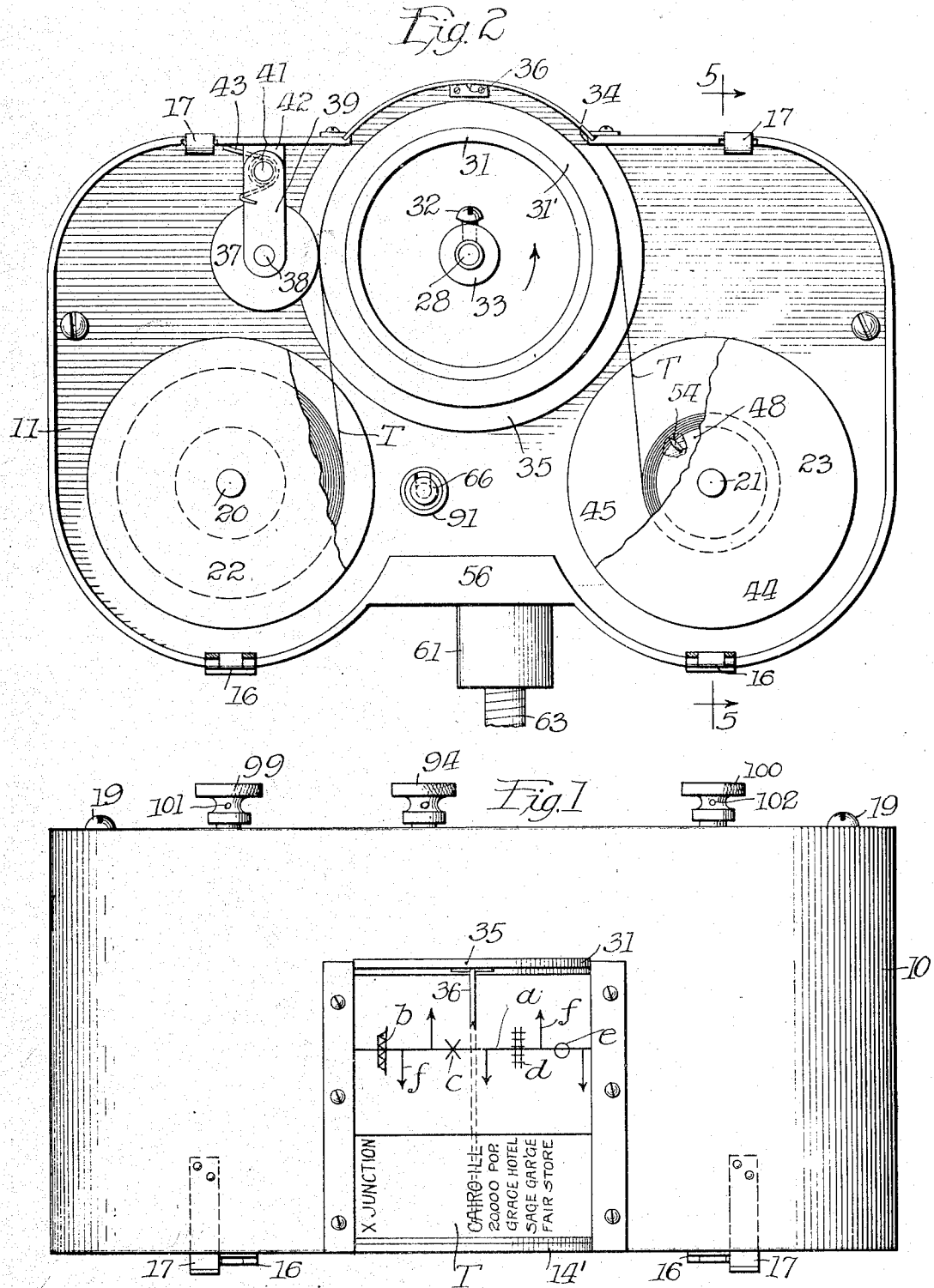

UNITED STATES PATENT OFFICE.

WILLIAM E. REILLY, OF CHICAGO, ILLINOIS, ASSIGNOR OF ONE-HALF TO VICTOR W. ADAMS, OF CHICAGO, ILLINOIS.

ROUTE-INDICATOR.

1,175,992.

Specification of Letters Patent.   Patented Mar. 21, 1916.

Application filed May 3, 1915.  Serial No. 25,519.

*To all whom it may concern:*

Be it known that I, WILLIAM E. REILLY, a citizen of the United States, and a resident of Chicago, in the county of Cook and State of Illinois, have invented certain new and useful Improvements in Route-Indicators, of which the following is the specification.

My invention relates to route indicators particularly adaptable for use on automobiles for indicating routes and information in connection therewith, as for example, mileage, turns, obstructions, signs, reference to places of interest along the route, etc.

Heretofore route and guide books have been used by tourists but such books have many disadvantages. In the first place, they are difficult to handle, particularly if it is windy. In the second place, the driver himself cannot handle a book as he is busy with guiding and controlling the machine, a book being therefore practically useless where only the driver is in the machine, it requiring another person besides the driver for consulting the book and giving the information to the driver, with the further disadvantage that the driver must get the information second-handed.

The general purpose of my invention is therefore to provide an indicating device which is controlled by the travel of the machine and which can be placed in position to be comfortably and readily observed by the driver without in any wise disturbing and interfering with control and guiding of the machine by him.

Among the important objects of the invention are to produce a simple compact indicating device which can be readily coupled to a wheel of the vehicle and which involves a tape which passes through a field of sight on the instrument and which tape has thereon the desired information concerning a certain route.

Another object is to provide improved pay-out and in-take reel mechanism, and feed mechanism for the tape and improved propelling mechanism therefor for causing travel of the tape and movement of the indications thereon through the line of sight at a rate proportional and in synchronism with the route traveled over.

Another object is to provide improved construction for enabling removal of reels and substitution of others.

Another object is to provide for uncoupling of the reel mechanism from the drive mechanism and for enabling movement of the tape independently of the drive mechanism in order that the tape may be adjusted before starting or, if necessary, brought into adjustment at any time during travel over a route.

The above and other features of the invention are clearly illustrated on the accompanying drawings in which—

Figure 1 is a plan view of the device, Fig. 2 is a view of the reel side of the device with the cover removed, Fig. 3 is a view of the propulsion mechanism side with the cover removed and parts broken away, Fig. 4 is a plan view with part of the top wall removed, Fig. 5 is a sectional view on plane 5—5, Fig. 2, Fig. 6 is a sectional view on plane 6—6, Fig. 3, and Fig. 7 is a sectional view on plane 7—7, Fig. 5.

The inclosing structure for the mechanism of the device is in the form of a rectangular body part 10 preferably of sheet metal, divided by a longitudinal partition 11 into side compartments 12 and 13 for containing respectively tape propelling and guiding mechanism, and propulsion mechanism therefor. The tape mechanism side of the body is adapted to be closed by a cover 14, and the propulsion mechanism side is adapted to be closed by a cover or lid 15, the cover 14 being preferably hinged to the bottom of the body 10 as indicated at 16, and latches 17 being preferably provided at the top of the body for locking the cover in closed position. Posts 18 extending laterally from the partition wall 11 form seats for the cover or lid 15, and screws 19 may be utilized for securing the lid in closing position to the posts.

Extending transversely through the body at the sides and below the center line thereof are reel shafts 20 and 21 for supporting respectively the intake reel structure 22 and the pay-out reel structure 23. These shafts are journaled in the partition 11, the ends thereof extending through the compartment 12, being journaled in the openings 24 and 25 in the cover 14, and the other ends of the shafts being journaled in openings 26 and 27 provided in the lid 15 when the cover and lid are closed. Above the shafts 20 and 21 and midway therebetween, the shaft 28 extends transversely through the body 10, being journaled in the partition wall 11 and at its ends in openings 29 and 30 provided in the covers 14 and 15 respectively. Secured to the shaft 28 in compartment 12 is a guide and propulsion wheel 31 having a friction jacket 31' preferably of rubber. The wheel may be detachably secured to the shaft by means of a set screw 32 passing through the wheel hub 33. The tape T which is unwound from reel structure 23 and taken up by reel structure 22, passes around the wheel 31 and through a sight opening 34 cut in the top of the body 10 and through which opening part of the wheel periphery extends, as clearly indicated in Fig. 2. A guard wall 35 extends upwardly from the partition 11 and at one side of the wheel 31, while the cover 14 has the guard extension 14' for extending alongside the outer side of the wheel adjacent the sight opening, these guard extensions protecting the tape. From the guard extension 35 a sight rod 36 extends transversely across the sight opening a short distance above the wheel periphery, past which rod the various indications on the tape pass as the tape is carried through the sight opening by the propulsion wheel 31. In order to hold the tape to the wheel 31 and to increase the propulsion friction, a presser roller 37 is provided, this roller being mounted on a shaft 38 journaled in the links 39 and 40 extending from and pivoted on the ends of a rod 41 which is supported in the U-frame 42 suspended from the top wall of the frame body 10. A spring 43 coiled about the rod 41 and abutting against the frame 10 and the links 39 and 40 tend to press the roller against the tape traveling with the wheel 31, and as the wheel 31 is turned the tape is propelled therewith and unwound from the pay-out reel structure and taken up on the in-take reel structure.

The reel structures referred to may be of the same construction. In Figs. 2, 5 and 7 the construction and arrangement of the reel structure is clearly shown, Fig. 5 showing a sectional view of the pay-out reel construction. The reel structure comprises outer and inner end disks 44 and 45, and a tubular core 46. Preferably, this core is secured to the outer end disk 44 and the inner disk 45 is confined on the shaft 21 and against the partition 11 by a pin or key 47 passing through the shaft, the shaft fitting the core 46 and forming a bearing therefor. With this arrangement and when the cover 14 is open, the reel end 44 together with the tubular core 46 can be readily withdrawn from the shaft together with the spool 48 mounted on the reel core and adapted for receiving the tape. Each length of tape is wound up on a spool so that when a trip is started the spool having the tape for the desired route can be placed on the pay-out reel core and the end of the tape then passed over the propulsion wheel 31 and secured to the spool of the intake reel structure. As best shown in Fig. 7, each spool has preferably a metallic bushing 49 provided with a spline 50 for engaging in the spline-way 51 formed in the spool, the spool being preferably of wood and the metallic bushing serving to strengthen the spool and prevent wear. In order to lock the spool and reel core to the shaft 21 the end of the bushing has slots 52 and the end of the core has slots 53 adapted to register with the slots 52 so that when the reel core is slipped onto the shaft 21 the registering slots will receive the opposite projecting ends of the pin or key 47, the spool and reel core being then locked to the shaft against rotational displacement thereon. The structure of the intake reel mechanism is the same as that of the pay-out reel mechanism just described and when the removable reel sections with the spools thereon have been slipped into the shafts 20 and 21 and the cover 14 is closed to receive the shaft ends in the bearing openings 24 and 25, the reel structures will be locked in place and the device is ready for operation. In order to prevent slippage of the tape on the spools, each spool is provided with projecting points 54 for receiving the tape end, and when the pay-out reel structure with the full spool thereon has been inserted the end of the tape is passed over the end of the propulsion wheel 31 and applied to the points on the spool of the take-up reel mechanism, and then when the propulsion mechanism operates the tape will be unwound from the pay-out reel and will be wound up on the spool of the take-up reel.

Describing now the driving mechanism for the reel structures and propulsion wheel, a vertical drive shaft 55 is journaled in the strengthened wall section 56 at the bottom of the frame body 10. The lower end of the shaft has the coupling head 57; and a collar 58 pinned to the shaft above the wall section 56 locks the shaft in its bearing. A coupling socket 58' receives the coupling head 57 and has a coupling tongue 59 for engaging in the coupling slot 60 in the head, the coupling socket being held to the coupling head by a cap 61 threaded to the extension 62 from wall section 56. A flexible shaft 63 extending from the coupling socket is adapted for rotational connection at its other end with one of the wheels of the vehicle, in any well known manner. The inner end of the shaft 55 carries a worm 64 which meshes with a gear 65 mounted on a shaft 66. Above and to the right (Figs. 3 and 4) of the shaft 66 is a shaft 67 on which is secured the gear wheel 68, the shaft being journaled at its inner end in the partition 11, and at its outer end in a bearing opening 69 provided in cover 15. Above and to the right of shaft 67 is another shaft 70 on which is secured the gear 71 and the pulley 72, the gear 71 meshing with the gear 68. The shaft 70 is journaled at its inner end in partition 11 and at its outer end in the bearing 73 provided in the cover 15. Below the pulley 72 the shaft 20 for the take-up reel mechanism has secured thereto a pulley 74, a belt 75 passing about the pulleys. Therefore, as the main shaft 55 is rotated, the intake reel mechanism will be revolved.

Directly above the shaft 65, the shaft 76 carries a gear 77 which meshes with the gear 78 secured on the shaft 67, the shaft 76 being journaled at its inner end in partition 11 and at its outer end in the bearing opening 79 provided in the cover 15. To the left of shaft 76 is another shaft 80 journaled at its inner end in the partition 11 and at its outer end in an opening 81 provided in the cover 15. This shaft 80 has secured thereto a gear 82 which meshes with gear 77 and carries also a pulley 83 connected by belt 84 with the pulley 85 secured to the shaft 21 of the pay-out reel mechanism 23. Above the shaft 80 is the shaft 86 journaled at its inner end in partition 11 and at its outer end in opening 87 in the cover 15 and this shaft carries the gear pinion 88 which meshes with gear 89 secured to the shaft 28 which carries the propulsion wheel 31.

When the main shaft 55 is rotated the reel structures and the propulsion wheel 31 are all positively rotated. The gearing arrangement and proportion is, however, such that the reels will be rotated in a direction antagonistic to the directions of rotation of propulsion wheel 21 and at a greater peripheral rate. More specifically, the arrangement is such that the driving train between the shaft 55 and the intake roll mechanism will tend to rotate the spool to pull on the tape in a direction away from the propulsion wheel 31 faster than the tape is delivered to the spool from the wheel, and the driving train between the shaft 55 and the pay-out reel mechanism 23 will tend to rotate the spool to pull the tape away from the propulsion wheel, the direction of rotation effort being in the direction of the arrows $x$ and $y$. However, the belts 75 and 84 are elastic and sufficiently frictionless to allow slippage thereof on the small pulleys 74 and 83, so that the friction of the tape on the rubber jacketed propulsion wheel 31 will prevent slippage of the tape on such wheel and any slippage must occur between the belts and the pulleys, the result being that the tape will always be taut, it being taken up on the intake roll and un-wound from the pay-out roll, the pay-out roll being rotated by the unwinding pull of the tape against the slip driving train which tends to rotate it in opposite direction. If necessary, the belts and pulley surfaces can be oiled to facilitate slippage, but care must be taken to prevent too much slippage in order that slack will always be taken up and the tape kept taut.

In Fig. 1 an idea is given how the tape may be marked and printed to indicate the route and information in connection therewith. The line $a$ will indicate the route traveled over, $b$ might represent a bridge, $c$ a slow-speed signal, $d$ a railroad crossing, $e$ a culvert, etc., while the laterally extending arrows $f$ might indicate cross roads to be taken in the direction indicated. At one side of the tape legends $g$ could be printed indicative of towns or localities and information with reference thereto. The indicator would preferably be secured in position to be conveniently and readily observed by the driver and as the tape propelled across the sight opening and past the sight rod 36 the driver can readily observe the indications and information on the tape and can control and guide his machine accordingly. After he has gone over one route he can open up the indicator and take out the reel mechanisms and then remove the take-up spool with the wound-up tape thereon and apply to the pay-out reel mechanism another spool with tape wound thereon for the next route he intends to travel over.

In order to better enable adjustment of the tape with reference to the sight opening after the tape has been placed in position on the reel structures, and also to enable adjustment and setting of the tape at any time during travel over a route, provision is made for uncoupling the driving trains from the shaft 55 and for independently turning the reels. As best shown in Fig. 6, the shaft 66 which carries the gear 65 is slidable in a sleeve 90 extending from partition 11 into compartment 13. Encircling the inner end of the shaft and compressed between the partition 11 and a collar 91 secured to the shaft end, is a spring 92 which tends to hold the shaft in with the gear 65 in mesh with the worm and with the gear 68. The outer end of the shaft 66 extends through opening 93 in cover 15 and has the knurled head 94 secured thereto by means of which it might be pulled outwardly against the force of spring 92 to unmesh the gear 65 from the worm and from the gear 68. In order to hold the shaft in its outer position it has a lock pin 95 adapted to pass through the slot 96 in the cover 15 adjacent opening 93, and when the shaft is rotated after pulling out thereof the pin will be out of register with the slot and will abut against the cover 15 to lock the shaft in outer position. The head 94 has preferably screw threaded engagement with the shaft in order that it may be removed to allow removal of the cover 15. The ends of the reel mechanism shafts 20 and 21 have threaded extensions 97 and 98 beyond the cover 15 for receiving knurled heads 99 and 100 respectively, these heads being adapted to be locked against unscrewing by pins 101 and 102, which pins are removable in order to allow removal of the heads when it is desired to remove the cover 15. When the shaft 66 is pulled out and the transmission trains uncoupled from the drive shaft 55 either one of the heads 99 or 100 can be turned to effect rotation of the corresponding reel mechanism to cause propulsion of the tape and adjustment thereof with reference to the sight opening and the sight rod 36. Then when the shaft 66 is released and the gear 65 again carried into mesh the trains will be connected with the drive shaft 55 and the indicator will operate as soon as the vehicle is started.

I thus provide a simple, compact and efficient route indicator which can be readily secured in position to be conveniently consulted by the driver of a vehicle without interfering with his control of the vehicle.

I do not, of course, desire to be limited to the exact constructions, arrangement and operations described as changes and modifications are no doubt possible which would still come within the scope of the invention.

I claim the following:

1. In a route indicator, the combination of an inclosing frame having a sight opening, a reel structure for tape to be drawn past said sight opening, a drive shaft journaled in said frame, a supporting shaft for the reel structure and driving connection therebetween and said drive shaft, said reel structure comprising inner and outer end disks and a tubular core, one end disk being permanently mounted on said shaft and said other end disk being secured to the core and separable from said shaft, a spool detachably slidable on said core, the ends of said spool and core being slotted, a key on said reel shaft for receiving said slots when the reel core with the spool thereon is slid on to the reel shaft whereby said spool and core are secured to the reel shaft against rotation thereon.

2. In a route indicator, the combination of an inclosing frame having a sight opening, a reel structure for tape to be drawn past said sight opening, a drive shaft journaled in said frame, a supporting shaft for the reel structure and driving connection therebetween and said drive shaft, said reel structure comprising inner and outer end disks and a tubular core, one end disk being permanently mounted on said shaft and said other end disk being secured to the core and separable from said shaft, a spool detachably slidable on said core, the ends of said spool and core being slotted, a key on said reel shaft for receiving said slots when the reel core with the spool thereon is slid onto the reel shaft whereby said spool and core are secured to the reel shaft against rotation thereon, and a cover for said frame having a bearing opening for receiving the outer end of said reel shaft when closed, and serving when closed to confine the reel to said reel shaft.

In witness whereof I have hereunto set my hand this 1st day of May, A. D., 1915.

W. E. REILLY.

Witnesses:
ALBERT G. ROSENBAUM,
RICHARD R. KLEIN.